United States Patent [19]

Takagi et al.

[11] Patent Number: 4,988,650

[45] Date of Patent: Jan. 29, 1991

[54] AUXILIARY AGENT FOR SINTERING CERAMIC MATERIAL

[75] Inventors: Hiroshi Takagi, Ohtsu; Yukio Sakabe, Kyoto, both of Japan

[73] Assignee: Murata Manufacturing Co., Ltd., Japan

[21] Appl. No.: 370,464

[22] Filed: Jun. 23, 1989

[51] Int. Cl.$^5$ .............................................. C04B 35/46
[52] U.S. Cl. ................................. 501/134; 501/138; 501/139
[58] Field of Search ........................ 501/134, 138, 139

[56] References Cited

U.S. PATENT DOCUMENTS

| | | | |
|---|---|---|---|
| 4,459,364 | 7/1984 | McSweeney et al. | 501/137 |
| 4,485,181 | 11/1984 | Sakabe | 501/136 |
| 4,610,970 | 9/1986 | Wada et al. | 501/137 |

*Primary Examiner*—William R. Dixon, Jr.
*Assistant Examiner*—Chris Gallo
*Attorney, Agent, or Firm*—Ostrolenk, Faber, Gerb & Soffen

[57] ABSTRACT

An auxiliary agent for sintering ceramics comprises a basic composition consisting essentially of (a) 5 to 40 mol % of at least two oxides selected from the group consisting of ZnO, SnO and MnO, the sum of the contents of ZnO and MnO being not less than 5 mol %, (b) 5 to 40 mol % of at least one metal oxide expressed by the general formula: RO where R is at least one element selected from the group consisting of Ba, Sr, Ca and Mg, and (c) 30 to 70 mol % of $(Ti, Si)O_2$, the content of $SiO_2$ being not less than 15 mol %. The auxiliary agent may contain at least one additive selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$. The total content of the additive is not more than 20 parts by weight per 100 parts by weight of the basic composition, and the content of at least one metal oxide selected from the group consisting of $Y_2O_3$, $ZrO_2$, $WO_3$, $MoO_2$, $Fe_2O_3$, CoO, NiO, PbO and $Bi_2O_3$ should be not more than 10 parts by weight per 100 parts by weight of the basic composition. The auxiliary agent may further contain 2 to 45 mol % of $Li_2O$. SnO and MnO may be omitted from the basic composition.

5 Claims, No Drawings

AUXILIARY AGENT FOR SINTERING CERAMIC MATERIAL

BACKGROUND OF THE INVENTION

1. Field of the Invention

The present invention relates to an auxiliary agent for sintering ceramic materials and, more particularly, an auxiliary agent for sintering dielectric ceramic materials.

2. Description of the Prior Art

In general, ceramic dielectrics mainly comprising barium titanate ($BaTiO_3$), or strontium titanate ($SrTiO_3$), or titanium oxide ($TiO_2$) or the like have widely been used for production of monolithic ceramic capacitors. Such monolithic ceramic capacitors are generally built up of an arrangement of alternating two layers of a dielectric ceramic layer and an internal electrode layer and are produced by preparing ceramic green sheets, forming a layer of metal paste for internal electrodes on each ceramic green sheet, stacking them and firing the resultant stacked body at a temperature of 1300° C. and above. It is therefore required to use a high-melting noble metal such as platinum-palladium as a material for internal electrodes to prevent from oxidation.

However, the noble metals are expensive and occupy a greater part, generally about 30 to 50%, of the production cost of monolithic ceramic capacitors. Thus, the use of the noble metal sets a limit to reduce the production cost of the monolithic ceramic capacitors. In addition, a sintering furnace is considerably damaged at high sintering temperatures of not less than 1300° C., resulting in increase of maintenance cost of the furnace with the operating time being elapsed. Further, the sintering at high temperatures results in considerable increase of the energy cost required for production of monolithic ceramic capacitors.

To solve such problems, it has been proposed to use a lead-containing dielectric ceramics with a low-sintering temperature or nonreducible dielectric ceramics, as a material for capacitors. These ceramic materials make it possible to use cheap metals such as nickel as a material for internal electrodes of the monolithic ceramic capacitors. Also, attempt has been proposed to produce monolithic ceramic capacitors by a process comprising the steps of preparing multilayer sintered ceramic bodies with plural spaces between adjacent ceramic layers, pouring a molten metal such as lead or a lead-tin alloy into each space to form internal electrodes, and cooling the same to solidify the molten metal. However, such new dielectric ceramic materials have some disadvantages awaiting a solution.

On the other hand, the dielectric ceramic compositions of the prior art have excellent dielectric properties required for production of ceramic capacitors including monolithic ceramic capacitors. Thus, if the dielectric ceramic compositions of the prior art can be sintered at low sintering temperature, there is no need to use the above new dielectric ceramic materials.

SUMMARY OF THE INVENTION

It is therefore a main object of the present invention to provide a auxiliary agent for sintering dielectric ceramics that makes it possible to lower the sintering temperature of dielectric ceramic compositions without causing deterioration of electrical properties thereof.

According to the present invention, the above and other objects are solved by providing a auxiliary agent for sintering ceramics, that comprises a basic composition composed of (a) 5 to 40 mol % of at least two oxides selected from the group consisting of ZnO, SnO and MnO, the sum of the contents of ZnO and MnO being not less than 5 mol%, (b) 5 to 40 mol % of a metal oxide expressed by the general formula: RO where R is at least one metal selected from the group consisting of oxides of Ba, Sr, Ca and Mg, and (c) 30 to 70 mol % of (Ti, Si)$O_2$, the content of $SiO_2$ being not less than 15 mol %.

In the above basic composition, SnO and MnO of the group (a) may be omitted therefrom. Further, the above basic composition is incorporated with 2 to 45 mol % of $LiO_2$ as the occasion demands.

In a preferred embodiment, the above basic composition is incorporated with at least one additive selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$. The preferred content of the additive is not more than 20 parts by weight per 100 parts by weight of the basic composition. However, the content of at least one metal oxide selected from the group consisting of $Y_2O_3$, $ZrO_2$, $WO_3$, $MoO_2$, $Fe_2O_3$, CoO, NiO, PbO and $Bi_2O_3$ should be not more than 10 parts by weight per 100 parts by weight of the basic composition.

DETAILED DESCRIPTION OF THE INVENTION

According to the present invention, there is provided an auxiliary agent for sintering ceramics, consisting essentially of a basic composition and an additive incorporated therein, said basic composition consisting essentially of (a) 5 to 40 mol % of at least two oxides selected from the group consisting of ZnO, SnO and MnO, the sum of the contents of ZnO and MnO being not less than 5 mol %, (b) 5 to 40 mol % of at least one metal oxide selected from the group consisting of oxides of Ba, Sr, Ca and Mg, and (c) 30 to 70 mol % of (Ti, Si)$O_2$, the content of $SiO_2$ being not less than 15 mol %, said additive being at least one metal oxide selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$, the content of the additive being 0 to 20 parts by weight per 100 parts by weight of the basic composition, the content of at least one metal oxide selected from the group consisting of $Y_2O_3$, $ZrO_2$, $WO_3$, $MoO_2$, $Fe_2O_3$, CoO, NiO, PbO and $Bi_2O_3$ being not more than 10 parts by weight per 100 parts by weight of the basic composition.

According to the present invention, there is further provided an auxiliary agent for sintering dielectric ceramics, consisting essentially of a basic composition and an additive incorporated therein, said basic composition consisting essentially of (a) 5 to 40 mol % of ZnO, (b) 5 to 40 mol % of at least one metal oxide selected from the group consisting of oxides of Ba, Sr, Ca and Mg, and (c) 30 to 70 mol % of (Ti, Si)$O_2$, the content of $SiO_2$ being not less than 15 mol %, said additive being at least one metal oxide selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$, the content of the additive being 0 to 20 parts by weight per 100 parts by weight of the basic composition, the content of at least one metal oxide selected from the group consisting of $Y_2O_3$, $ZrO_2$, $WO_3$, $MoO_2$, $Fe_2O_3$, CoO, NiO, PbO and $Bi_2O_3$ being not more than 10 parts by weight per 100 parts by weight of the basic composition.

According to the present invention, there is also provided an auxiliary agent for sintering dielectric ceramics, consisting essentially of a basic composition and an additive incorporated therein, said basic composition consisting essentially of (a) 5 to 40 mol % of at least two oxides selected from the group consisting of ZnO, SnO and MnO, the sum of the contents of ZnO and MnO being not less than 5 mol %, (b) 5 to 40 mol % of at least one metal oxide selected from the group consisting of oxides of Ba, Sr, Ca and Mg, (c) 30 to 70 mol % of $(Ti, Si)O_2$, the content of $SiO_2$ being not less than 15 mol %, and (d) 2 to 45 mol % of $Li_2O$, said additive being at least one metal oxide selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$, the content of the additive being 0 to 20 parts by weight per 100 parts by weight of the basic composition, the content of at least one metal oxide selected from the group consisting of $Y_2O_3$, $ZrO_2$, $WO_3$, $MoO_2$, $Fe_2O_3$, CoO, NiO, PbO and $Bi_2O_3$ being not more than 10 parts by weight per 100 parts by weight of the basic composition.

The reasons why the contents of respective components in the auxiliary agent of the present invention have been limited to the above respective ranges are as follows.

If the content of ZnO or the sum of the contents of at least two oxides of ZnO, SnO and MnO in the basic composition is less than 5 mol % or exceeds 40 mol %, the sintering temperature of the dielectric ceramic composition incorporated with the auxiliary agent becomes higher than 1300° C., thus making it impossible to achieve the object of the present invention. Where ZnO is used in combination with MnO and/or SnO, the sum of the contents of ZnO and MnO has been so limited as being not less than 5 mol % for the following reasons. If the sum of the contents of ZnO and MnO is less than 5 mol %, it is impossible to lower the sintering temperature of the dielectric ceramic composition to less than 1300° C.

If the content of the metal oxide expressed by the general formula: RO (R is at least one metal of Ba, Sr, Ca and Mg) is less than 5 mol % or exceeds 40 mol %, it is impossible to lower the sintering temperature of the dielectric composition to less than 1300° C.

If the content of $(Ti, Si)O_2$ is less than 30 mol % or exceeds 70 mol %, it is impossible to lower the sintering temperature of the dielectric composition to less than 1300° C. Also, if the content of $SiO_2$ is less than 15 mol % or if the auxiliary agent contains no $TiO_2$, it is impossible to achieve lowering of the sintering temperature of the dielectric ceramic composition.

Where $Li_2O$ is employed as one component of the basic composition, if the content of $Li_2O$ is less than 2 mol %, it is difficult to lower the sintering temperature of the dielectric ceramic composition to less than 1300° C. If the content of $Li_2O$ exceeds 45 mol %, the auxiliary agent would have a melting temperature of less than 800° C., resulting in deformation of the ceramic compact during sintering.

If the content of the additive composed of at least one metal oxide selected from the group consisting of $Al_2O_3$, $B_2O_3$, CuO, $Nb_2O_5$, $Ta_2O_5$, $Ga_2O_3$ and $GeO_2$, $Y_2O_3$, $ZrO_2$, $WO_3$, $MoO_2$, $Fe_2O_3$, CoO, NiO, PbO and $Bi_2O_3$ exceeds 20 parts by weight per 100 parts by weight of the basic composition, or if the content of at least one metal oxide selected from the group consisting of $Y_2O_3$, $ZrO_2$, $WO_3$, $MoO_2$, $Fe_2O_3$, CoO, NiO, PbO and $Bi_2O_3$ exceeds 10 parts by weight per 100 parts by weight of the basic composition, it is impossible to lower the sintering temperature of the dielectric composition to less than 1300° C. Further, if the content of the additive exceeds the above range, the auxiliary agent fuses and solidified during its vitrification, thus making it impossible to prepare powder of the auxiliary agent with preferred particle sizes.

The auxiliary agent of the present invention may be prepared by mixing raw materials in the predetermined proportions, fusing the resultant mixture, vitrifying it and then powdering the resultant vitreous material. As raw materials for the auxiliary agent of the present invention, there may be used those such as oxides, carbonates and/or hydroxides of respective metals.

The thus prepared powder of the auxiliary agent is generally incorporated into a mixture of raw materials or calcined powder of the dielectric ceramic composition to be produced. However, it is also possible to use the auxiliary agent in the form of a mixture of raw materials. In this case, a mixture of raw materials for the auxiliary is added to calcined powder of the dielectric ceramic composition and the resultant mixture is compacted and then fired to produce sintered compact. An amount of the auxiliary agent to be incorporated into the dielectric ceramic composition varies with the main component of the dielectric ceramic composition, but it generally range from 0.05 to 25.0 wt %. If the added amount of the auxiliary agent is less than 0.05 wt %, it is impossible to achieve lowering of the sintering temperature of the dielectric ceramic composition. If the added amount of the auxiliary agent exceeds 25.0 wt %, the dielectric properties of the ceramic becomes considerably decreased.

It is preferred to use the auxiliary agent of the present invention for production of dielectric ceramic compositions containing titanium oxide or complex oxide as the main component such as, for example, $BaTiO_3$, $SrTiO_3$, $BaTiO_3$—$CaZrO_3$, $BaTiO_3$—$CaSnO_3$—$CaZrO_3$, $PbTiO_3$, and the like.

The objects, features and advantages of the present invention will be further apparent from the following examples.

EXAMPLE 1

Using ZnO, SnO, MnO, $CaCO_3$, SrO, $BaCO_3$, $SiO_2$, $TiO_2$, $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$ as raw materials, there were prepared mixtures of raw materials to produce auxiliary agents each having a composition shown in Table 1. Each mixture was wet-milled in a polyethylene mill with alumina balls for 16 hours and then dried by evaporation. The resultant mixed powder was placed in a zirconia saggar, calcined at 800° C. for 2 hours, and then crushed to prepare powder of an auxiliary agent with particle size passing through a 200 mesh sieve screen.

Separate from the above, using $BaCO_3$, $CaCO_3$, $TiO_2$, $SnO_2$, $ZrO_2$ as raw materials for a main component of a dielectric ceramic composition and MnO as a raw material for an additive, there was prepared a mixture of raw materials to produce a dielectric ceramic composition, 84 mol % $BaTiO_3$-10 mol % $CaSnO_3$-6 mol % $CaZrO_3$+1 wt % MnO. The resultant mixture was wet-milled in a polyethylene mill with alumina balls for 16 hours and then dried by evaporation. The resultant mixed powder was placed in a zirconia saggar, calcined at 1100° C. for 2 hours, and then crushed to prepare calcined powder of the dielectric ceramic composition with particle size passing through a 200 mesh sieve screen.

The powder of each auxiliary agent was added to the calcined powder of the dielectric ceramic composition in the compositional proportions shown in Table 1. The resultant mixture was wet-milled together with a suitable amount of polyvinyl alcohol incorporated therein as a binder, dried by evaporation, granulated and then pressed into disks with a diameter of 10 mm and a thickness of 1 mm under a pressure of 1000 kg/cm$^2$. The resultant green compacts were fired in an air atmosphere at various temperatures ranging from 800° to 1350° C. for 2 hours to produce sintered discs.

Some of the resultant ceramic discs were immersed in a fuchsin solution to determine the optimum sintering temperature for each dielectric ceramic composition. The optimum sintering temperatures for the ceramic compositions are shown in Table 1.

The ceramic discs fired at its optimum sintering temperature were provided on its opposite sides with silver electrodes by applying silver paste with the screen printing, and then baking it at a temperature of 800° C. for 30 minutes to prepare specimens for measurements of electrical properties. For each specimen, the measurements were made on dielectric constant ($\epsilon$) and dielectric loss (tan $\delta$) at 1 KHz, 1 Vr.m.s. and 25° C. as well as the temperature characteristics of dielectric constant. Results are shown in Table 2.

In Table 1 and 2, specimens with an asterisk (*) are those having a composition beyond the scope of the present invention, while other specimens are those included in the scope of the present invention.

In Table 2, the temperature characteristics of the specimens are classified with the ratings B, C, D, E and F established by JIS (Japanese Industrial Standard), which are defined as bellow.

B rating, means that a temperature change rate of capacitance with respect to a capacitance at 20° C. lies within the range of −10 to +10% at an operating temperature range of −25° C. to +85° C.

C rating, means that a temperature change rate of capacitance with respect to a capacitance at 20° C. lies within the range of −20 to +20% at an operating temperature range of −25° C. to +85° C.

D rating, means that a temperature change rate of capacitance with respect to a capacitance at 20° C. lies within the range of −30 to +20% at an operating temperature range of −25° C. to +85° C.

E rating, means that a temperature change rate of capacitance with respect to a capacitance at 20° C. lies within the range of −55 to +20% at an operating temperature range of −25° C. to +85° C.

F rating, means that temperature change rate of capacitance with respect to a capacitance at 20° C. lies within the range of −80 to +30% at an operating temperature range of −25° C. to +85° C.

From the results shown in Table 2, it will be seen that the sintering temperature of the dielectric ceramic composition can be lowered by incorporation of the auxiliary agent of the present invention in an amount of not less than 0.05 wt %. As can be seen from the results for specimens Nos. 1-1 to 1-11, the greater the added amount of the auxiliary agent, the smaller is the dielectric constant at room temperature. However, with the increase in the added amount of the auxiliary agent, the temperature property is improved step by step from the F rating to E rating, D rating, C rating and then B rating. Further, the added amount of the auxiliary agent scarcely has an effect on the dielectric loss of the dielectric ceramic composition.

TABLE 1

| No. | Dielectric powder (wt %) | Sintering auxiliary (wt %) | Composition of sintering auxiliary | | | | | | | | | Additive (part by weight) | Sintering Temp. (°C.) |
|---|---|---|---|---|---|---|---|---|---|---|---|---|---|
| | | | Basic composition (mol %) | | | | | | | | | | |
| | | | ZnO | SnO | MnO | MgO | CaO | SrO | BaO | SiO$_2$ | TiO$_2$ | | |
| 1-1* | 100 | 0 | — | — | — | — | — | — | — | — | — | — | 1,300 |
| 1-2* | 99.96 | 0.04 | 10 | 5 | 10 | 2 | 6 | 6 | 6 | 48 | 7 | — | 1,300 |
| 1-3 | 99.95 | 0.05 | 10 | 5 | 10 | 2 | 6 | 6 | 6 | 48 | 7 | — | 1,295 |
| 1-4 | 99.9 | 0.1 | 10 | 5 | 10 | 2 | 6 | 6 | 6 | 48 | 7 | — | 1,290 |
| 1-5 | 99 | 1 | 10 | 5 | 10 | 2 | 6 | 6 | 6 | 48 | 7 | — | 1,200 |
| 1-6 | 98 | 2 | 10 | 5 | 10 | 2 | 6 | 6 | 6 | 48 | 7 | — | 1,150 |
| 1-7 | 95 | 5 | 10 | 5 | 10 | 2 | 6 | 6 | 6 | 48 | 7 | — | 1,130 |
| 1-8 | 92.5 | 7.5 | 10 | 5 | 10 | 2 | 6 | 6 | 6 | 48 | 7 | — | 1,100 |
| 1-9 | 90 | 10 | 10 | 5 | 10 | 2 | 6 | 6 | 6 | 48 | 7 | — | 1,050 |
| 1-10 | 80 | 20 | 10 | 5 | 10 | 2 | 6 | 6 | 6 | 48 | 7 | — | 950 |
| 1-11 | 75 | 25 | 10 | 5 | 10 | 2 | 6 | 6 | 6 | 48 | 7 | — | 900 |
| 1-12* | 74 | 26 | 10 | 5 | 10 | 2 | 6 | 6 | 6 | 48 | 7 | — | — |
| 1-13a | 99 | 1 | 5 | 2 | — | 2 | 9 | 9 | 9 | 57 | 7 | — | 1,295 |
| 1-13b | 99 | 1 | — | 2 | 5 | 2 | 9 | 9 | 9 | 57 | 7 | — | 1,295 |
| 1-14a | 99 | 1 | 2 | — | 3 | 2 | 9 | 9 | 9 | 59 | 7 | — | 1,290 |
| 1-14b* | 99 | 1 | 4 | 2 | — | 2 | 9 | 9 | 9 | 58 | 7 | — | 1,300 |
| 1-15a* | 99 | 1 | — | 2 | 4 | 2 | 9 | 9 | 9 | 58 | 7 | — | 1,305 |
| 1-15b* | 99 | 1 | 2 | 2 | 2 | 2 | 9 | 9 | 9 | 58 | 7 | — | 1,300 |
| 1-16 | 99 | 1 | 10 | 5 | 10 | 5 | 0 | 0 | 0 | 60 | 10 | — | 1,295 |
| 1-17 | 99 | 1 | 10 | 5 | 10 | 0 | 5 | 0 | 0 | 60 | 10 | — | 1,295 |
| 1-18 | 99 | 1 | 10 | 5 | 10 | 0 | 0 | 5 | 0 | 60 | 10 | — | 1,290 |
| 1-19 | 99 | 1 | 10 | 5 | 10 | 0 | 0 | 0 | 5 | 60 | 10 | — | 1,290 |
| 1-20* | 99 | 1 | 10 | 5 | 11 | 4 | 0 | 0 | 0 | 60 | 10 | — | 1,310 |
| 1-21* | 99 | 1 | 10 | 5 | 11 | 0 | 4 | 0 | 0 | 60 | 10 | — | 1,310 |
| 1-22* | 99 | 1 | 10 | 5 | 11 | 0 | 0 | 4 | 0 | 60 | 10 | — | 1,310 |
| 1-23* | 99 | 1 | 10 | 5 | 11 | 0 | 0 | 0 | 4 | 60 | 10 | — | 1,300 |

TABLE 1-continued

| No. | Dielectric powder (wt %) | Sintering auxiliary (wt %) | Composition of sintering auxiliary | | | | | | | | | Additive (part by weight) | | Sintering Temp. (°C.) |
|---|---|---|---|---|---|---|---|---|---|---|---|---|---|---|
| | | | Basic composition (mol %) | | | | | | | | | | | |
| | | | ZnO | SnO | MnO | MgO | CaO | SrO | BaO | SiO$_2$ | TiO$_2$ | | | |
| 1-24* | 99 | 1 | 10 | 5 | 9 | 0 | 0 | 0 | 5 | 60 | 11 | — | — | 1,300 |
| 1-25 | 99 | 1 | 10 | 5 | 10 | 10 | 10 | 10 | 10 | 30 | 5 | — | — | 1,290 |
| 1-26* | 99 | 1 | 10 | 4 | 10 | 10 | 10 | 10 | 11 | 30 | 5 | — | — | 1,300 |
| 1-27* | 99 | 1 | 8 | 4 | 8 | 10 | 10 | 10 | 15 | 30 | 5 | — | — | 1,320 |
| 1-28 | 99 | 1 | 10 | 5 | 10 | 2 | 6 | 6 | 6 | 15 | 40 | — | — | 1,290 |
| 1-29* | 99 | 1 | 10 | 5 | 10 | 2 | 6 | 6 | 6 | 14 | 41 | — | — | 1,300 |
| 1-30* | 99 | 1 | 10 | 5 | 10 | 2 | 6 | 6 | 6 | 10 | 45 | — | — | 1,330 |
| 1-31 | 99 | 1 | 4 | 2 | 4 | 2 | 6 | 6 | 6 | 55 | 15 | — | — | 1,290 |
| 1-32* | 99 | 1 | 4 | 2 | 4 | 1 | 6 | 6 | 6 | 56 | 15 | — | — | 1,300 |
| 1-33* | 99 | 1 | 4 | 2 | 4 | 1 | 6 | 6 | 6 | 55 | 16 | — | — | 1,300 |
| 1-34 | 99 | 1 | 10 | 5 | 10 | 2 | 6 | 6 | 6 | 54 | 1 | — | — | 1,295 |
| 1-35* | 99 | 1 | 10 | 5 | 10 | 2 | 6 | 6 | 6 | 55 | 0 | — | — | 1,300 |
| 1-36 | 99 | 1 | 15 | 10 | 15 | 2 | 6 | 6 | 6 | 38 | 2 | — | — | 1,295 |
| 1-37* | 99 | 1 | 16 | 10 | 15 | 2 | 6 | 6 | 6 | 37 | 2 | — | — | 1,305 |
| 1-38* | 99 | 1 | 15 | 11 | 15 | 2 | 6 | 6 | 6 | 37 | 2 | — | — | 1,305 |
| 1-39* | 99 | 1 | 15 | 10 | 16 | 2 | 6 | 6 | 6 | 37 | 2 | — | — | 1,305 |
| 1-40* | 99 | 1 | 21 | 0 | 20 | 2 | 6 | 6 | 6 | 37 | 2 | — | — | 1,300 |
| 1-41* | 99 | 1 | 20 | 0 | 21 | 2 | 6 | 6 | 6 | 37 | 2 | — | — | 1,300 |
| 1-42 | 99 | 1 | 20 | 0 | 20 | 2 | 6 | 6 | 6 | 38 | 2 | — | — | 1,290 |
| 1-43 | 99 | 1 | 10 | 5 | 10 | 2 | 6 | 6 | 6 | 48 | 7 | Al$_2$O$_3$ | 20 | 1,295 |
| 1-44* | 99 | 1 | 10 | 5 | 10 | 2 | 6 | 6 | 6 | 48 | 7 | Al$_2$O$_3$ | 21 | 1,300 |
| 1-45 | 99 | 1 | 10 | 5 | 10 | 2 | 6 | 6 | 6 | 48 | 7 | CuO | 20 | 1,295 |
| 1-46* | 99 | 1 | 10 | 5 | 10 | 2 | 6 | 6 | 6 | 48 | 7 | CuO | 21 | 1,300 |
| 1-47a | 99 | 1 | 10 | 5 | 10 | 2 | 6 | 6 | 6 | 48 | 7 | B$_2$O$_3$ | 20 | 1,295 |
| 1-47b | 99 | 1 | 10 | 5 | 10 | 2 | 6 | 6 | 6 | 48 | 7 | Nb$_2$O$_5$ | 20 | 1,295 |
| 1-47c | 99 | 1 | 10 | 5 | 10 | 2 | 6 | 6 | 6 | 48 | 7 | Ta$_2$O$_5$ | 20 | 1,295 |
| 1-47d | 99 | 1 | 10 | 5 | 10 | 2 | 6 | 6 | 6 | 48 | 7 | Ga$_2$O$_3$ | 20 | 1,295 |
| 1-47e | 99 | 1 | 10 | 5 | 10 | 2 | 6 | 6 | 6 | 48 | 7 | GeO$_2$ | 20 | 1,295 |
| 1-48a* | 99 | 1 | 10 | 5 | 10 | 2 | 6 | 6 | 6 | 48 | 7 | B$_2$O$_3$ | 21 | 1,305 |
| 1-48b* | 99 | 1 | 10 | 5 | 10 | 2 | 6 | 6 | 6 | 48 | 7 | Nb$_2$O$_5$ | 21 | 1,305 |
| 1-48c* | 99 | 1 | 10 | 5 | 10 | 2 | 6 | 6 | 6 | 48 | 7 | Ta$_2$O$_5$ | 21 | 1,305 |
| 1-48d* | 99 | 1 | 10 | 5 | 10 | 2 | 6 | 6 | 6 | 48 | 7 | Ga$_2$O$_3$ | 21 | 1,305 |
| 1-48e* | 99 | 1 | 10 | 5 | 10 | 2 | 6 | 6 | 6 | 48 | 7 | GeO$_2$ | 21 | 1,305 |
| 1-49a | 99 | 1 | 10 | 5 | 10 | 2 | 6 | 6 | 6 | 48 | 7 | ZrO$_2$ | 10 | 1,290 |
| 1-49b | 99 | 1 | 10 | 5 | 10 | 2 | 6 | 6 | 6 | 48 | 7 | NO$_3$ | 10 | 1,290 |
| 1-49c | 99 | 1 | 10 | 5 | 10 | 2 | 6 | 6 | 6 | 48 | 7 | MoO$_3$ | 10 | 1,290 |
| 1-49d | 99 | 1 | 10 | 5 | 10 | 2 | 6 | 6 | 6 | 48 | 7 | Fe$_2$O$_3$ | 10 | 1,290 |
| 1-49e | 99 | 1 | 10 | 5 | 10 | 2 | 6 | 6 | 6 | 48 | 7 | CoO | 10 | 1,290 |
| 1-49f | 99 | 1 | 10 | 5 | 10 | 2 | 6 | 6 | 6 | 48 | 7 | NiO | 10 | 1,290 |
| 1-49g | 99 | 1 | 10 | 5 | 10 | 2 | 6 | 6 | 6 | 48 | 7 | PbO | 10 | 1,290 |
| 1-49h | 99 | 1 | 10 | 5 | 10 | 2 | 6 | 6 | 6 | 48 | 7 | Bi$_2$O$_3$ | 10 | 1,290 |
| 1-50a* | 99 | 1 | 10 | 5 | 10 | 2 | 6 | 6 | 6 | 48 | 7 | ZrO$_2$ | 11 | 1,300 |
| 1-50b* | 99 | 1 | 10 | 5 | 10 | 2 | 6 | 6 | 6 | 48 | 7 | NO$_3$ | 11 | 1,300 |
| 1-50c* | 99 | 1 | 10 | 5 | 10 | 2 | 6 | 6 | 6 | 48 | 7 | MoO$_3$ | 11 | 1,300 |
| 1-50d* | 99 | 1 | 10 | 5 | 10 | 2 | 6 | 6 | 6 | 48 | 7 | Fe$_2$O$_3$ | 11 | 1,300 |
| 1-50e* | 99 | 1 | 10 | 5 | 10 | 2 | 6 | 6 | 6 | 48 | 7 | CoO | 11 | 1,300 |
| 1-50f* | 99 | 1 | 10 | 5 | 10 | 2 | 6 | 6 | 6 | 48 | 7 | NiO | 11 | 1,300 |
| 1-50g* | 99 | 1 | 10 | 5 | 10 | 2 | 6 | 6 | 6 | 48 | 7 | PbO | 11 | 1,300 |
| 1-50h* | 99 | 1 | 10 | 5 | 10 | 2 | 6 | 6 | 6 | 48 | 7 | Bi$_2$O$_3$ | 11 | 1,300 |
| 1-51 | 99 | 1 | 10 | 5 | 10 | 2 | 6 | 6 | 6 | 48 | 7 | Y$_2$O$_3$ | 10 | 1,290 |
| 1-52* | 99 | 1 | 10 | 5 | 10 | 2 | 6 | 6 | 6 | 48 | 7 | Y$_2$O$_3$ | 11 | 1,305 |

TABLE 2

| No. | Electric properties | | | No. | Electric properties | | |
|---|---|---|---|---|---|---|---|
| | Dielectric constant ($\epsilon$) | Dielectric loss tan$\delta$ (%) | Temp. property | | Dielectric constant ($\epsilon$) | Dielectric loss tan$\delta$ (%) | Temp. property |
| 2-1* | 12,400 | 0.8 | F | 2-17 | 10,800 | 0.9 | F |
| 2-2* | 12,400 | 0.7 | F | 2-18 | 12,400 | 0.7 | F |
| 2-3 | 12,400 | 0.8 | F | 2-19 | 12,300 | 0.8 | F |
| 2-4 | 11,500 | 0.7 | F | 2-20* | 12,100 | 0.8 | F |
| 2-5 | 10,800 | 0.7 | F | 2-21* | 11,800 | 0.7 | F |
| 2-6 | 7,900 | 0.9 | E | 2-22* | 11,700 | 0.9 | F |
| 2-7 | 4,400 | 0.5 | E | 2-23* | 12,300 | 0.6 | F |
| 2-8 | 2,800 | 0.8 | D | 2-24* | 12,200 | 0.9 | F |
| 2-9 | 1,500 | 0.9 | C | 2-25 | 11,500 | 0.8 | F |
| 2-10 | 700 | 1.2 | B | 2-26* | 11,400 | 0.7 | F |
| 2-11 | 500 | 1.0 | B | 2-27* | 12,900 | 0.9 | F |
| 2-12* | compact deformed | | | 2-28 | 12,300 | 0.8 | F |
| 2-13a | 12,300 | 0.7 | F | 2-29* | 12,100 | 0.8 | F |
| 2-13b | 11,800 | 0.8 | F | 2-30* | 12,800 | 0.7 | F |
| 2-14a | 12,000 | 0.7 | F | 2-31 | 12,100 | 0.6 | F |
| 2-14b* | 12,100 | 0.7 | F | 2-32* | 12,200 | 0.9 | F |
| 2-15a* | 12,100 | 1.0 | F | 2-33* | 12,000 | 0.8 | F |
| 2-15b* | 12,000 | 0.9 | F | 2-34 | 11,800 | 0.7 | F |
| 2-16 | 11,000 | 0.8 | F | 2-35* | 11,000 | 0.8 | F |

TABLE 2-continued

| No. | Dielectric constant ($\epsilon$) | Dielectric loss tan$\delta$ (%) | Temp. property |
|---|---|---|---|
| 2-36 | 12,100 | 0.9 | F |
| 2-37* | 12,000 | 0.8 | F |
| 2-38* | 12,100 | 0.7 | F |
| 2-39* | 11,800 | 0.8 | F |
| 2-40* | 11,900 | 0.9 | F |
| 2-41* | 12,000 | 0.9 | F |
| 2-42 | 11,700 | 0.9 | F |
| 2-43 | 11,200 | 0.9 | F |
| 2-44* | 12,000 | 1.0 | F |
| 2-45 | 11,800 | 0.8 | F |
| 2-46* | 10,700 | 1.1 | F |
| 2-47 | 12,100 | 1.0 | F |
| 2-48* | 12,200 | 1.0 | F |
| 2-49 | 12,100 | 1.0 | F |
| 2-50* | 11,800 | 1.1 | F |
| 2-51 | 11,700 | 1.0 | F |
| 2-52* | 11,000 | 1.1 | F |

EXAMPLE 2

Using $SrCO_3$, PbO, $CaCO_3$, $Bi_2O_3$, $TiO_2$ and MnO as raw materials, there was prepared calcined powder of a dielectric ceramic composition, 35 mol % $SrTiO_3$-15 mol % $PbTiO_3$-17 mol % $CaTiO_3$-7 mol % $Bi_2O_3$-26 mol % $TiO_2$+0.1 wt % MnO, in the same manner as in Example 1. The resultant calcined powder was added with an auxiliary agent so that it has a composition shown in Table 3, and the resultant mixture was then treated in the same manner as in Example 1 to prepare specimens for measurements of electrical properties.

For the resultant specimens, electrical properties were determined in the same manner as in Example 1. Results are shown in Table 4.

In Tables 3 and 4, specimens with an asterisk (*) are those having a composition beyond the scope of the present invention, while other specimens are those included in the scope of the present invention.

TABLE 3

| No. | Dielectric powder (wt %) | Sintering auxiliary (wt %) | Composition of sintering auxiliary | | | | | | | | | Additive (part by weight) | | Sintering Temp. (°C.) |
|---|---|---|---|---|---|---|---|---|---|---|---|---|---|---|
| | | | Basic composition (mol %) | | | | | | | | | | | |
| | | | ZnO | SnO | MnO | MgO | CaO | SrO | BaO | $SiO_2$ | $TiO_2$ | | | |
| 3-1* | 100 | 0 | — | — | — | — | — | — | — | — | — | — | — | 1,210 |
| 3-2 | 99.95 | 0.05 | 10 | 5 | 15 | 1 | 6 | 6 | 7 | 47 | 3 | — | — | 1,200 |
| 3-3 | 98 | 2 | 10 | 5 | 15 | 1 | 6 | 6 | 7 | 47 | 3 | $Al_2O_3$ | 3 | 1,120 |
| 3-4 | 96 | 4 | 10 | 5 | 15 | 1 | 6 | 6 | 7 | 47 | 3 | — | — | 1,100 |
| 3-5 | 90 | 10 | 10 | 5 | 15 | 1 | 6 | 6 | 7 | 47 | 3 | — | — | 1,050 |

TABLE 4

| No. | Dielectric constant ($\epsilon$) | Dielectric loss tan$\delta$ (%) | Temp. property |
|---|---|---|---|
| 4-1* | 1,500 | 0.4 | C |
| 4-2 | 1,500 | 0.4 | C |
| 4-3 | 1,100 | 0.6 | B |
| 4-4 | 1,000 | 0.9 | B |
| 4-5 | 600 | 0.8 | B |

As will be understood from the results shown in Table 4, the sintering temperature of the dielectric ceramic composition can be lowered by incorporation of the auxiliary agent of the present invention. By increasing the added amount of the auxiliary agent, the dielectric constant is decreased, while the temperature property is improved from the C rating to B rating. Further, the added amount of the auxiliary agent scarcely has an effect on the dielectric loss of the dielectric ceramic composition.

EXAMPLE 3

Using $BaCO_3$, $CaCO_3$, $TiO_2$, $ZrO_2$, MgO and MnO as raw materials, there was prepared calcined powder of a dielectric ceramic composition, 81.5 mol % $BaTiO_3$-8 mol % $BaZrO_3$-10 mol % $CaZrO_3$-0.5 mol % MgO+0.3 wt % MnO, in the same manner as in Example 1. The resultant calcined powder was added with a previously prepared auxiliary agent having a composition shown in Table 5 in the proportions shown in that table, and the resultant mixture was then treated in the same manner as in Example 1 except for that the firing was carried out in a reducing atmosphere of $N_2$ containing 1% of $H_2$, to prepare specimens for measurements of electrical properties.

For each resultant specimen, electrical properties were determined in the same manner as in Example 1. Results are shown in Table 6.

TABLE 5

| No. | Dielectric powder (wt %) | Sintering auxiliary (wt %) | Composition of sintering auxiliary | | | | | | | | | Additive (part by weight) | | Sintering Temp. (°C.) |
|---|---|---|---|---|---|---|---|---|---|---|---|---|---|---|
| | | | Basic composition (mol %) | | | | | | | | | | | |
| | | | ZnO | SnO | MnO | MgO | CaO | SrO | BaO | $SiO_2$ | $TiO_2$ | | | |
| 5-1* | 100 | 0 | — | — | — | — | — | — | — | — | — | — | — | 1,290 |
| 5-2 | 99.9 | 0.1 | 10 | 5 | 10 | 2 | 5 | 10 | 5 | 43 | 10 | — | — | 1,285 |
| 5-3 | 98 | 2 | 10 | 5 | 10 | 2 | 5 | 10 | 5 | 43 | 10 | CuO | 1 | 1,250 |
| 5-4 | 90 | 10 | 10 | 5 | 10 | 2 | 5 | 10 | 5 | 43 | 10 | — | — | 1,150 |
| 5-5* | 74 | 26 | 10 | 5 | 10 | 2 | 5 | 10 | 5 | 43 | 10 | — | — | — |

TABLE 6

| No. | Dielectric constant ($\epsilon$) | Dielectric loss tan$\delta$ (%) | Temp. property |
|---|---|---|---|
| 6-1* | 12,200 | 0.5 | F |
| 6-2 | 12,200 | 0.5 | F |
| 6-3 | 9,800 | 0.6 | E |
| 6-4 | 3,100 | 0.4 | D |
| 6-5* | compact deformed | | |

In Tables 5 and 6, specimens with an asterisk (*) are those having a composition beyond the scope of the present invention, while other specimens are those included in the scope of the present invention.

As will be understood from the results shown in Table 6, the sintering temperature of the dielectric ceramic composition can be reduced by incorporation of the auxiliary agent of the present invention. By increasing the added amount of the auxiliary agent, the dielectric constant at room temperature is decreased, while the temperature property is improved from the F rating to the E rating and then B rating. However, the auxiliary agent has no effect on the dielectric constant if the added amount is less the 0.1 wt %. The added amount of the auxiliary agent scarcely has an effect on the dielectric loss of the dielectric ceramic composition.

EXAMPLE 4

Using the same raw materials as those used in Example 1, there were prepared mixtures of raw materials to produce auxiliary agents each having a composition shown in Table 7. Each mixture was wet-milled in a polyethylene mill with alumina balls for 16 hours and then dried by evaporation. The resultant mixed powder was placed in a zirconia saggar, calcined at 800° C. for 2 hours, and then crushed to prepare powder of an auxiliary agent with particle size passing through a 200 mesh sieve screen.

The calcined powder of dielectric ceramic composition prepared in Example 1 was added with each of the above auxiliary agent in the proportions shown in Table 7, and wet-milled together with a suitable amount of polyvinyl alcohol, dried by evaporation, granulated and then pressed into disks with a diameter of 10 mm and a thickness of 1 mm under a pressure of 1000 kg/cm$^2$. The resultant green compacts were fired in an air atmosphere at various temperatures ranging from 800° to 1350° C. for 2 hours to produce sintered discs.

The optimum sintering temperature for each dielectric ceramic composition was determined by immersing the sintered discs in a fuchsin solution. Results are also shown in Table 7.

For each resultant specimen, electrical properties were determined in the same manner as in Example 1. Results are shown in Table 8.

EXAMPLE 5

Using the same raw materials as those used in Example 2, there were respectively prepared powder of auxiliary agents each having a composition shown in Table 9, and calcined powder of a dielectric ceramic composition, 35 mol % $SrTiO_3$-15 mol % $PbTiO_3$-17 mol % $CaTiO_3$-7 mol % $Bi_2O_3$-26 mol % $TiO_2$+0.1 wt % MnO, in the same manner as in Example 1.

The calcined powder of the dielectric ceramic composition and the auxiliary agent were mixed in the proportions shown in Table 9, and then treated in the same manner as in Example 1 to prepare specimens for measurements of electrical properties.

For the resultant specimens, electrical properties were determined in the same manner as in Example 1. Results are shown in Table 10.

EXAMPLE 6

Using the same materials as those used in Example 3, there were respectively prepared calcined powder of a dielectric ceramic composition, 81.5 mol % $BaTiO_3$-8 mol % $BaZrO_3$-10 mol % $CaZrO_3$-0.5 mol % MgO+0.3 wt % MnO, and auxiliary agents each having a composition shown in Table 11, in the same manner as in Example 1. The calcined powder of the dielectric ceramic composition and the auxiliary agent were mixed in the proportions shown in Table 11, and then treated in the same manner as in Example 1 except for that the firing was carried out in a reducing atmosphere of $N_2$ containing 1% of $H_2$ to prepare specimens for measurements of electrical properties.

For each resultant specimen, electrical properties were determined in the same manner as in Example 1. Results are shown in Table 12.

EXAMPLE 7

Using the same raw materials as those used in Example 1, there were respectively prepared powder of auxiliary agents each having a composition shown in Table 13, and calcined powder of a dielectric ceramic composition, 84 mol % $BaTiO_3$-10 mol % $CaSnO_3$-6mol % $CaZrO_3$+1 wt % MnO, in the same manner as in Example 1.

The optimum sintering temperature for each dielectric ceramic composition was determined by immersing the sintered discs in a fuchsin solution. Results are also shown in Table 13.

For each resultant specimen, electrical properties were determined in the same manner as in Example 1. Results are shown in Table 14.

EXAMPLE 8

Using the same raw materials as those used in Example 2, there were respectively prepared calcined powder of a dielectric ceramic composition, 35 mol % $SrTiO_3$-15 mol % $PbTiO_3$-17 mol % $CaTiO_3$-7 mol % $Bi_2O_3$-26 mol % $TiO_2$+0.1 wt % MnO, and powder of auxiliary agents each having a composition shown in Table 15, in the same manner as in Example 1.

The calcined powder of the dielectric ceramic composition and the auxiliary agent were mixed in the proportions shown in Table 15, and then treated in the same manner as in Example 1 to prepare specimens for measurements of electrical properties.

For the resultant specimens, electrical properties were determined in the same manner as in Example 1. Results are shown in Table 16.

EXAMPLE 9

Using the same materials as those used in Example 3, there were respectively prepared calcined powder of a dielectric ceramic composition, 81.5 mol % $BaTiO_3$-8 mol % $BaZrO_3$-10 mol % $CaZrO_3$-0.5 mol % MgO+0.3 wt % MnO, and auxiliary agents each having a composition shown in Table 17, in the same manner as in Example 1. The calcined powder of the dielectric ceramic composition and the auxiliary agent were mixed in the proportions shown in Table 17, and then treated in the same manner as in Example 1 except for that the firing was carried out in a reducing atmosphere of $N_2$ containing 1% of $H_2$ to prepare specimens for measurements of electrical properties.

For each resultant specimen, electrical properties were determined in the same manner as in Example 1. Results are shown in Table 18.

TABLE 7

| No. | Dielectric powder (wt %) | Sintering auxiliary (wt %) | ZnO | SnO | MnO | Li$_2$O | MgO | CaO | SrO | BaO | SiO$_2$ | TiO$_2$ | Additive | (part by weight) | Sintering Temp. (°C.) |
|---|---|---|---|---|---|---|---|---|---|---|---|---|---|---|---|
| 7-1* | 100 | 0 | — | — | — | — | — | — | — | — | — | — | — | — | 1,300 |
| 7-2* | 99.96 | 0.04 | 2 | 2 | 2 | 19 | 2 | 6 | 6 | 6 | 48 | 7 | — | — | 1,300 |
| 7-3 | 99.95 | 0.05 | 2 | 2 | 2 | 19 | 2 | 6 | 6 | 6 | 48 | 7 | — | — | 1,295 |
| 7-4 | 99.9 | 0.1 | 2 | 2 | 2 | 19 | 2 | 6 | 6 | 6 | 48 | 7 | — | — | 1,290 |
| 7-5 | 99 | 1 | 2 | 2 | 2 | 19 | 2 | 6 | 6 | 6 | 48 | 7 | — | — | 1,195 |
| 7-6 | 98 | 2 | 2 | 2 | 2 | 19 | 2 | 6 | 6 | 6 | 48 | 7 | — | — | 1,150 |
| 7-7 | 95 | 5 | 2 | 2 | 2 | 19 | 2 | 6 | 6 | 6 | 48 | 7 | — | — | 1,125 |
| 7-8 | 92.5 | 7.5 | 2 | 2 | 2 | 19 | 2 | 6 | 6 | 6 | 48 | 7 | — | — | 1,100 |
| 7-9 | 90 | 10 | 2 | 2 | 2 | 19 | 2 | 6 | 6 | 6 | 48 | 7 | — | — | 1,055 |
| 7-10 | 80 | 20 | 2 | 2 | 2 | 19 | 2 | 6 | 6 | 6 | 48 | 7 | — | — | 950 |
| 7-11 | 75 | 25 | 2 | 2 | 2 | 19 | 2 | 6 | 6 | 6 | 48 | 7 | — | — | 900 |
| 7-12* | 74 | 26 | 2 | 2 | 2 | 19 | 2 | 6 | 6 | 6 | 48 | 7 | — | — | — |
| 7-13 | 99 | 1 | 2 | 2 | 2 | 9 | 2 | 7 | 7 | 7 | 55 | 7 | — | — | 1,250 |
| 7-14 | 99 | 1 | 2 | 2 | 2 | 2 | 2 | 7 | 7 | 7 | 62 | 7 | — | — | 1,280 |
| 7-15* | 99 | 1 | 2 | 2 | 2 | 1 | 2 | 7 | 7 | 7 | 63 | 7 | — | — | 1,300 |
| 7-16 | 99 | 1 | 2 | 2 | 2 | 19 | 5 | 0 | 0 | 0 | 60 | 10 | — | — | 1,295 |
| 7-17 | 99 | 1 | 2 | 2 | 2 | 19 | 0 | 5 | 0 | 0 | 60 | 10 | — | — | 1,295 |
| 7-18 | 99 | 1 | 2 | 2 | 2 | 19 | 0 | 0 | 5 | 0 | 60 | 10 | — | — | 1,290 |
| 7-19 | 99 | 1 | 2 | 2 | 2 | 19 | 0 | 0 | 0 | 5 | 60 | 10 | — | — | 1,290 |
| 7-20* | 99 | 1 | 2 | 2 | 2 | 20 | 4 | 0 | 0 | 0 | 60 | 10 | — | — | 1,310 |
| 7-21* | 99 | 1 | 2 | 2 | 2 | 20 | 0 | 4 | 0 | 0 | 60 | 10 | — | — | 1,310 |
| 7-22* | 99 | 1 | 2 | 2 | 2 | 20 | 0 | 0 | 4 | 0 | 60 | 10 | — | — | 1,310 |
| 7-23* | 99 | 1 | 2 | 2 | 2 | 20 | 0 | 0 | 0 | 4 | 60 | 10 | — | — | 1,300 |
| 7-24* | 99 | 1 | 2 | 2 | 2 | 18 | 0 | 0 | 0 | 5 | 60 | 11 | — | — | 1,300 |
| 7-25 | 99 | 1 | 2 | 2 | 2 | 19 | 10 | 10 | 10 | 10 | 30 | 5 | — | — | 1,290 |
| 7-26* | 99 | 1 | 2 | 2 | 2 | 18 | 10 | 10 | 10 | 11 | 30 | 5 | — | — | 1,300 |
| 7-27* | 99 | 1 | 2 | 2 | 2 | 14 | 10 | 10 | 10 | 15 | 30 | 5 | — | — | 1,320 |
| 7-28 | 99 | 1 | 2 | 2 | 2 | 19 | 2 | 6 | 6 | 6 | 15 | 40 | — | — | |
| 7-29* | 99 | 1 | 2 | 2 | 2 | 19 | 2 | 6 | 6 | 6 | 14 | 41 | — | — | 1,300 |
| 7-30* | 99 | 1 | 2 | 2 | 2 | 19 | 2 | 6 | 6 | 6 | 10 | 45 | — | — | 1,330 |
| 7-31 | 99 | 1 | 2 | 2 | 2 | 10 | 2 | 4 | 4 | 4 | 55 | 15 | — | — | 1,290 |
| 7-32* | 99 | 1 | 2 | 2 | 2 | 10 | 1 | 4 | 4 | 4 | 56 | 15 | — | — | 1,300 |
| 7-33* | 99 | 1 | 2 | 2 | 2 | 10 | 1 | 4 | 4 | 4 | 55 | 16 | — | — | 1,300 |
| 7-34 | 99 | 1 | 2 | 2 | 2 | 19 | 2 | 6 | 6 | 6 | 54 | 1 | — | — | 1,295 |
| 7-35* | 99 | 1 | 2 | 2 | 2 | 19 | 2 | 6 | 6 | 6 | 55 | 0 | — | — | 1,300 |
| 7-36 | 99 | 1 | 40 | 0 | 0 | 2 | 0 | 3 | 3 | 3 | 44 | 5 | — | — | 1,295 |
| 7-37* | 99 | 1 | 0 | 0 | 40 | 2 | 0 | 3 | 3 | 3 | 44 | 5 | — | — | 1,290 |
| 7-38 | 99 | 1 | 0 | 40 | 0 | 2 | 0 | 3 | 3 | 3 | 44 | 5 | — | — | 1,295 |
| 7-39* | 99 | 1 | 41 | 0 | 0 | 2 | 0 | 3 | 3 | 3 | 43 | 5 | — | — | 1,305 |
| 7-40* | 99 | 1 | 0 | 0 | 41 | 2 | 0 | 3 | 3 | 3 | 43 | 5 | — | — | 1,300 |
| 7-41* | 99 | 1 | 0 | 41 | 0 | 2 | 0 | 3 | 3 | 3 | 43 | 5 | — | — | 1,305 |
| 7-42 | 99 | 1 | 2 | 2 | 2 | 19 | 2 | 6 | 6 | 6 | 48 | 7 | Al$_2$O$_3$ | 20 | 1,295 |
| 7-43* | 99 | 1 | 2 | 2 | 2 | 19 | 2 | 6 | 6 | 6 | 48 | 7 | Al$_2$O$_3$ | 21 | 1,300 |
| 7-44 | 99 | 1 | 2 | 2 | 2 | 19 | 2 | 6 | 6 | 6 | 48 | 7 | CuO | 20 | 1,295 |
| 7-45* | 99 | 1 | 2 | 2 | 2 | 19 | 2 | 6 | 6 | 6 | 48 | 7 | CuO | 21 | 1,300 |
| 7-46a | 99 | 1 | 2 | 2 | 2 | 19 | 2 | 6 | 6 | 6 | 48 | 7 | B$_2$O$_3$ | 20 | 1,295 |
| 7-46b | 99 | 1 | 2 | 2 | 2 | 19 | 2 | 6 | 6 | 6 | 48 | 7 | Nb$_2$O$_5$ | 20 | 1,295 |
| 7-46c | 99 | 1 | 2 | 2 | 2 | 19 | 2 | 6 | 6 | 6 | 48 | 7 | Ta$_2$O$_5$ | 20 | 1,295 |
| 7-46d | 99 | 1 | 2 | 2 | 2 | 19 | 2 | 6 | 6 | 6 | 48 | 7 | Ga$_2$O$_3$ | 20 | 1,295 |
| 7-46e | 99 | 1 | 2 | 2 | 2 | 19 | 2 | 6 | 6 | 6 | 48 | 7 | GeO$_2$ | 20 | 1,295 |
| 7-47a* | 99 | 1 | 2 | 2 | 2 | 19 | 2 | 6 | 6 | 6 | 48 | 7 | B$_2$O$_3$ | 21 | 1,305 |
| 7-47b* | 99 | 1 | 2 | 2 | 2 | 19 | 2 | 6 | 6 | 6 | 48 | 7 | Nb$_2$O$_5$ | 21 | 1,305 |
| 7-47c* | 99 | 1 | 2 | 2 | 2 | 19 | 2 | 6 | 6 | 6 | 48 | 7 | Ta$_2$O$_5$ | 21 | 1,305 |
| 7-47d* | 99 | 1 | 2 | 2 | 2 | 19 | 2 | 6 | 6 | 6 | 48 | 7 | Ga$_2$O$_3$ | 21 | 1,305 |
| 7-47e* | 99 | 1 | 2 | 2 | 2 | 19 | 2 | 6 | 6 | 6 | 48 | 7 | GeO$_2$ | 21 | 1,305 |
| 7-48a | 99 | 1 | 2 | 2 | 2 | 19 | 2 | 6 | 6 | 6 | 48 | 7 | ZrO$_2$ | 10 | 1,290 |
| 7-48b | 99 | 1 | 2 | 2 | 2 | 19 | 2 | 6 | 6 | 6 | 48 | 7 | NO$_3$ | 10 | 1,290 |
| 7-48c | 99 | 1 | 2 | 2 | 2 | 19 | 2 | 6 | 6 | 6 | 48 | 7 | MoO$_3$ | 10 | 1,290 |
| 7-48d | 99 | 1 | 2 | 2 | 2 | 19 | 2 | 6 | 6 | 6 | 48 | 7 | Fe$_2$O$_3$ | 10 | 1,290 |
| 7-48e | 99 | 1 | 2 | 2 | 2 | 19 | 2 | 6 | 6 | 6 | 48 | 7 | CoO | 10 | 1,290 |
| 7-48f | 99 | 1 | 2 | 2 | 2 | 19 | 2 | 6 | 6 | 6 | 48 | 7 | NiO | 10 | 1,290 |
| 7-48g | 99 | 1 | 2 | 2 | 2 | 19 | 2 | 6 | 6 | 6 | 48 | 7 | PbO | 10 | 1,290 |
| 7-48h | 99 | 1 | 2 | 2 | 2 | 19 | 2 | 6 | 6 | 6 | 48 | 7 | Bi$_2$O$_3$ | 10 | 1,290 |
| 7-49a* | 99 | 1 | 2 | 2 | 2 | 19 | 2 | 6 | 6 | 6 | 48 | 7 | ZrO$_2$ | 11 | 1,300 |
| 7-49b* | 99 | 1 | 2 | 2 | 2 | 19 | 2 | 6 | 6 | 6 | 48 | 7 | NO$_3$ | 11 | 1,300 |
| 7-49c* | 99 | 1 | 2 | 2 | 2 | 19 | 2 | 6 | 6 | 6 | 48 | 7 | MoO$_3$ | 11 | 1,300 |
| 7-49d* | 99 | 1 | 2 | 2 | 2 | 19 | 2 | 6 | 6 | 6 | 48 | 7 | Fe$_2$O$_3$ | 11 | 1,300 |
| 7-49e* | 99 | 1 | 2 | 2 | 2 | 19 | 2 | 6 | 6 | 6 | 48 | 7 | CoO | 11 | 1,300 |
| 7-49f* | 99 | 1 | 2 | 2 | 2 | 19 | 2 | 6 | 6 | 6 | 48 | 7 | NiO | 11 | 1,300 |
| 7-49g* | 99 | 1 | 2 | 2 | 2 | 19 | 2 | 6 | 6 | 6 | 48 | 7 | PbO | 11 | 1,300 |
| 7-49h* | 99 | 1 | 2 | 2 | 2 | 19 | 2 | 6 | 6 | 6 | 48 | 7 | Bi$_2$O$_3$ | 11 | 1,300 |
| 7-50 | 99 | 1 | 2 | 2 | 2 | 19 | 2 | 6 | 6 | 6 | 48 | 7 | Y$_2$O$_3$ | 10 | 1,290 |
| 7-51* | 99 | 1 | 2 | 2 | 2 | 19 | 2 | 6 | 6 | 6 | 48 | 7 | Y$_2$O$_3$ | 11 | 1,305 |

TABLE 8

| No. | Dielectric constant (ε) | Dielectric loss tanδ (%) | Temp. property |
|---|---|---|---|
| 8-1* | 12,400 | 0.8 | F |
| 8-2* | 12,400 | 0.7 | F |
| 8-3 | 12,400 | 0.8 | F |
| 8-4 | 11,500 | 0.7 | F |
| 8-5 | 10,800 | 0.7 | F |
| 8-6 | 7,900 | 0.9 | E |
| 8-7 | 4,400 | 0.5 | E |
| 8-8 | 2,800 | 0.8 | D |
| 8-9 | 1,500 | 0.9 | C |
| 8-10 | 700 | 1.2 | B |
| 8-11 | 500 | 1.0 | B |
| 8-12* | compact deformed | | |
| 8-13 | 12,300 | 0.7 | F |
| 8-14 | 12,000 | 0.7 | F |

TABLE 8-continued

| No. | Dielectric constant (ε) | Dielectric loss tanδ (%) | Temp. property |
|---|---|---|---|
| 8-40* | 11,000 | 0.9 | F |
| 8-41* | 11,100 | 0.7 | F |
| 8-42 | 11,200 | 0.9 | F |
| 8-43* | 12,000 | 1.0 | F |
| 8-44 | 11,800 | 0.8 | F |
| 8-45* | 10,700 | 1.1 | F |
| 8-46 | 12,100 | 1.0 | F |
| 8-47* | 12,200 | 1.0 | F |
| 8-48 | 12,100 | 1.0 | F |
| 8-49* | 11,800 | 1.1 | F |
| 8-50 | 11,700 | 1.0 | F |
| 8-51* | 11,000 | 1.1 | F |

TABLE 9

| No. | Dielectric powder (wt %) | Sintering auxiliary (wt %) | ZnO | SnO | MnO | Li₂O | MgO | CaO | SrO | BaO | SiO₂ | TiO₂ | Additive (part by weight) | | Sintering Temp. (°C.) |
|---|---|---|---|---|---|---|---|---|---|---|---|---|---|---|---|
| 9-1* | 100 | 0 | — | — | — | — | — | — | — | — | — | — | — | — | 1,210 |
| 9-2 | 99.95 | 0.05 | 2 | 2 | 2 | 24 | 1 | 6 | 6 | 7 | 47 | 3 | — | — | 1,200 |
| 9-3 | 98 | 2 | 2 | 2 | 2 | 24 | 1 | 6 | 6 | 7 | 47 | 3 | Al₂O₃ | 3 | 1,100 |
| 9-4 | 96 | 4 | 2 | 2 | 2 | 24 | 1 | 6 | 6 | 7 | 47 | 3 | — | — | 1,060 |
| 9-5 | 90 | 10 | 2 | 2 | 2 | 24 | 1 | 6 | 6 | 7 | 47 | 3 | — | — | 1,010 |

| No. | Dielectric constant (ε) | Dielectric loss tanδ (%) | Temp. property |
|---|---|---|---|
| 8-15* | 12,100 | 1.0 | F |
| 8-16 | 11,000 | 0.8 | F |
| 8-17 | 10,800 | 0.9 | F |
| 8-18 | 12,400 | 0.7 | F |
| 8-19 | 12,300 | 0.8 | F |
| 8-20* | 12,100 | 0.8 | F |
| 8-21* | 11,800 | 0.7 | F |
| 8-22* | 11,700 | 0.9 | F |
| 8-23* | 12,300 | 0.6 | F |
| 8-24* | 12,200 | 0.9 | F |
| 8-25 | 11,500 | 0.8 | F |
| 8-26* | 11,400 | 0.7 | F |
| 8-27* | 12,900 | 0.9 | F |
| 8-28 | 12,300 | 0.8 | F |
| 8-29* | 12,100 | 0.8 | F |
| 8-30* | 12,800 | 0.7 | F |
| 8-31 | 12,100 | 0.6 | F |
| 8-32* | 12,200 | 0.9 | F |
| 8-33* | 12,000 | 0.8 | F |
| 8-34 | 11,800 | 0.7 | F |
| 8-35* | 11,000 | 0.8 | F |
| 8-36 | 11,000 | 0.8 | F |
| 8-37 | 11,100 | 0.8 | F |
| 8-38 | 11,000 | 0.7 | F |
| 8-39* | 10,900 | 0.9 | F |

TABLE 10

| No. | Dielectric constant (ε) | Dielectric loss tanδ (%) | Temp. property |
|---|---|---|---|
| 10-1* | 1,500 | 0.4 | C |
| 10-2 | 1,500 | 0.4 | C |
| 10-3 | 1,200 | 0.6 | B |
| 10-4 | 900 | 0.8 | B |
| 10-5 | 700 | 0.8 | B |

TABLE 12

| No. | Dielectric constant (ε) | Dielectric loss tanδ (%) | Temp. property |
|---|---|---|---|
| 12-1* | 12,200 | 0.5 | F |
| 12-2 | 12,200 | 0.5 | F |
| 12-3 | 9,000 | 0.7 | E |
| 12-4 | 2,300 | 0.5 | D |
| 12-5* | compact deformed | | |

TABLE 11

| No. | Dielectric powder (wt %) | Sintering auxiliary (wt %) | ZnO | SnO | MnO | Li₂O | MgO | CaO | SrO | BaO | SiO₂ | TiO₂ | Additive (part by weight) | | Sintering Temp. (°C.) |
|---|---|---|---|---|---|---|---|---|---|---|---|---|---|---|---|
| 11-1* | 100 | 0 | — | — | — | — | — | — | — | — | — | — | — | — | 1,290 |
| 11-2 | 99.9 | 0.1 | 2 | 2 | 2 | 19 | 2 | 5 | 10 | 5 | 43 | 10 | — | — | 1,285 |
| 11-3 | 98 | 2 | 2 | 2 | 2 | 19 | 2 | 5 | 10 | 5 | 43 | 10 | CuO | 1 | 1,215 |
| 11-4 | 90 | 10 | 2 | 2 | 2 | 19 | 2 | 5 | 10 | 5 | 43 | 10 | — | — | 1,100 |
| 11-5* | 74 | 26 | 2 | 2 | 2 | 19 | 2 | 5 | 10 | 5 | 43 | 10 | — | — | — |

TABLE 13

| No. | Dielectric powder (wt %) | Sintering auxiliary (wt %) | ZnO | MgO | CaO | SrO | BaO | SiO₂ | TiO₂ | Additive (part by weight) | | Sintering Temp. (°C.) |
|---|---|---|---|---|---|---|---|---|---|---|---|---|
| 13-1* | 100 | 0 | — | — | — | — | — | — | — | — | — | 1,300 |
| 13-2* | 99.96 | 0.04 | 25 | 2 | 6 | 6 | 6 | 48 | 7 | — | — | 1,300 |
| 13-3 | 99.95 | 0.05 | 25 | 2 | 6 | 6 | 6 | 48 | 7 | — | — | 1,295 |
| 13-4 | 99.9 | 0.1 | 25 | 2 | 6 | 6 | 6 | 48 | 7 | — | — | 1,290 |
| 13-5 | 99 | 1 | 25 | 2 | 6 | 6 | 6 | 48 | 7 | — | — | 1,200 |
| 13-6 | 98 | 2 | 25 | 2 | 6 | 6 | 6 | 48 | 7 | — | — | 1,150 |
| 13-7 | 95 | 5 | 25 | 2 | 6 | 6 | 6 | 48 | 7 | — | — | 1,130 |

TABLE 13-continued

| No. | Dielectric powder (wt %) | Sintering auxiliary (wt %) | Composition of sintering auxiliary | | | | | | | Additive | | Sintering Temp. (°C.) |
|---|---|---|---|---|---|---|---|---|---|---|---|---|
| | | | Basic composition (mol %) | | | | | | | (part by weight) | | |
| | | | ZnO | MgO | CaO | SrO | BaO | $SiO_2$ | $TiO_2$ | | | |
| 13-8 | 92.5 | 7.5 | 25 | 2 | 6 | 6 | 6 | 48 | 7 | — | — | 1,100 |
| 13-9 | 90 | 10 | 25 | 2 | 6 | 6 | 6 | 48 | 7 | — | — | 1,050 |
| 13-10 | 80 | 20 | 25 | 2 | 6 | 6 | 6 | 48 | 7 | — | — | 950 |
| 13-11 | 75 | 25 | 25 | 2 | 6 | 6 | 6 | 48 | 7 | — | — | 900 |
| 13-12* | 74 | 26 | 25 | 2 | 6 | 6 | 6 | 48 | 7 | — | — | — |
| 13-13 | 99 | 1 | 9 | 2 | 9 | 9 | 9 | 55 | 7 | — | — | 1,250 |
| 13-14 | 99 | 1 | 5 | 2 | 9 | 9 | 9 | 59 | 7 | — | — | 1,280 |
| 13-15* | 99 | 1 | 4 | 2 | 9 | 9 | 9 | 60 | 7 | — | — | 1,300 |
| 13-16 | 99 | 1 | 25 | 5 | 0 | 0 | 0 | 60 | 10 | — | — | 1,295 |
| 13-17 | 99 | 1 | 25 | 0 | 5 | 0 | 0 | 60 | 10 | — | — | 1,295 |
| 13-18 | 99 | 1 | 25 | 0 | 0 | 5 | 0 | 60 | 10 | — | — | 1,290 |
| 13-19 | 99 | 1 | 25 | 0 | 0 | 0 | 5 | 60 | 10 | — | — | 1,290 |
| 13-20* | 99 | 1 | 26 | 4 | 0 | 0 | 0 | 60 | 10 | — | — | 1,310 |
| 13-21* | 99 | 1 | 26 | 0 | 4 | 0 | 0 | 60 | 10 | — | — | 1,310 |
| 13-22* | 99 | 1 | 26 | 0 | 0 | 4 | 0 | 60 | 10 | — | — | 1,310 |
| 13-23* | 99 | 1 | 26 | 0 | 0 | 0 | 4 | 60 | 10 | — | — | 1,300 |
| 13-24* | 99 | 1 | 24 | 0 | 0 | 0 | 5 | 60 | 11 | — | — | 1,300 |
| 13-25 | 99 | 1 | 25 | 10 | 10 | 10 | 10 | 30 | 5 | — | — | 1,290 |
| 13-26* | 99 | 1 | 24 | 10 | 10 | 10 | 11 | 30 | 5 | — | — | 1,300 |
| 13-27* | 99 | 1 | 20 | 10 | 10 | 10 | 15 | 30 | 5 | — | — | 1,320 |
| 13-28 | 99 | 1 | 25 | 2 | 6 | 6 | 6 | 15 | 40 | — | — | 1,290 |
| 13-29* | 99 | 1 | 25 | 2 | 6 | 6 | 6 | 14 | 41 | — | — | 1,300 |
| 13-30* | 99 | 1 | 25 | 2 | 6 | 6 | 6 | 10 | 45 | — | — | 1,330 |
| 13-31 | 99 | 1 | 10 | 2 | 6 | 6 | 6 | 55 | 15 | — | — | 1,290 |
| 13-32* | 99 | 1 | 10 | 1 | 6 | 6 | 6 | 56 | 15 | — | — | 1,300 |
| 13-33* | 99 | 1 | 10 | 1 | 6 | 6 | 6 | 55 | 16 | — | — | 1,300 |
| 13-34 | 99 | 1 | 25 | 2 | 6 | 6 | 6 | 54 | 1 | — | — | 1,295 |
| 13-35* | 99 | 1 | 25 | 2 | 6 | 6 | 6 | 55 | 0 | — | — | 1,300 |
| 13-36 | 99 | 1 | 40 | 0 | 4 | 4 | 4 | 45 | 3 | — | — | 1,295 |
| 13-37* | 99 | 1 | 41 | 0 | 4 | 4 | 4 | 44 | 3 | — | — | 1,300 |
| 13-38 | 99 | 1 | 25 | 2 | 6 | 6 | 6 | 48 | 7 | $Al_2O_3$ | 20 | 1,295 |
| 13-39* | 99 | 1 | 25 | 2 | 6 | 6 | 6 | 48 | 7 | $Al_2O_3$ | 21 | 1,300 |
| 13-40 | 99 | 1 | 25 | 2 | 6 | 6 | 6 | 48 | 7 | CuO | 20 | 1,295 |
| 13-41* | 99 | 1 | 25 | 2 | 6 | 6 | 6 | 48 | 7 | CuO | 21 | 1,300 |
| 13-42a | 99 | 1 | 25 | 2 | 6 | 6 | 6 | 48 | 7 | $B_2O_3$ | 20 | 1,295 |
| 13-42b | 99 | 1 | 25 | 2 | 6 | 6 | 6 | 48 | 7 | $Nb_2O_5$ | 20 | 1,295 |
| 13-42c | 99 | 1 | 25 | 2 | 6 | 6 | 6 | 48 | 7 | $Ta_2O_5$ | 20 | 1,295 |
| 13-42d | 99 | 1 | 25 | 2 | 6 | 6 | 6 | 48 | 7 | $Ga_2O_3$ | 20 | 1,295 |
| 13-42e | 99 | 1 | 25 | 2 | 6 | 6 | 6 | 48 | 7 | $GeO_2$ | 20 | 1,295 |
| 13-43a* | 99 | 1 | 25 | 2 | 6 | 6 | 6 | 48 | 7 | $B_2O_3$ | 21 | 1,305 |
| 13-43b* | 99 | 1 | 25 | 2 | 6 | 6 | 6 | 48 | 7 | $Nb_2O_5$ | 21 | 1,305 |
| 13-43c* | 99 | 1 | 25 | 2 | 6 | 6 | 6 | 48 | 7 | $Ta_2O_5$ | 21 | 1,305 |
| 13-43d* | 99 | 1 | 25 | 2 | 6 | 6 | 6 | 48 | 7 | $Ga_2O_3$ | 21 | 1,305 |
| 13-43e* | 99 | 1 | 25 | 2 | 6 | 6 | 6 | 48 | 7 | $GeO_2$ | 21 | 1,305 |
| 13-44 | 99 | 1 | 25 | 2 | 6 | 6 | 6 | 48 | 7 | $Y_2O_3$ | 10 | 1,290 |
| 13-45* | 99 | 1 | 25 | 2 | 6 | 6 | 6 | 48 | 7 | $Y_2O_3$ | 11 | 1,305 |
| 13-46a | 99 | 1 | 25 | 2 | 6 | 6 | 6 | 48 | 7 | $ZrO_2$ | 10 | 1,290 |
| 13-46b | 99 | 1 | 25 | 2 | 6 | 6 | 6 | 48 | 7 | $WO_3$ | 10 | 1,290 |
| 13-46c | 99 | 1 | 25 | 2 | 6 | 6 | 6 | 48 | 7 | $MoO_3$ | 10 | 1,290 |
| 13-46d | 99 | 1 | 25 | 2 | 6 | 6 | 6 | 48 | 7 | $Fe_2O_3$ | 10 | 1,290 |
| 13-46e | 99 | 1 | 25 | 2 | 6 | 6 | 6 | 48 | 7 | CoO | 10 | 1,290 |
| 13-46f | 99 | 1 | 25 | 2 | 6 | 6 | 6 | 48 | 7 | NiO | 10 | 1,290 |
| 13-46g | 99 | 1 | 25 | 2 | 6 | 6 | 6 | 48 | 7 | PbO | 10 | 1,290 |
| 13-46h | 99 | 1 | 25 | 2 | 6 | 6 | 6 | 48 | 7 | $Bi_2O_3$ | 10 | 1,290 |
| 13-47a* | 99 | 1 | 25 | 2 | 6 | 6 | 6 | 48 | 7 | $ZrO_2$ | 11 | 1,300 |
| 13-47b* | 99 | 1 | 25 | 2 | 6 | 6 | 6 | 48 | 7 | $WO_3$ | 11 | 1,300 |
| 13-47c* | 99 | 1 | 25 | 2 | 6 | 6 | 6 | 48 | 7 | $MoO_3$ | 11 | 1,300 |
| 13-47d* | 99 | 1 | 25 | 2 | 6 | 6 | 6 | 48 | 7 | $Fe_2O_3$ | 11 | 1,300 |
| 13-47e* | 99 | 1 | 25 | 2 | 6 | 6 | 6 | 48 | 7 | CoO | 11 | 1,300 |
| 13-47f* | 99 | 1 | 25 | 2 | 6 | 6 | 6 | 48 | 7 | NiO | 11 | 1,300 |
| 13-47g* | 99 | 1 | 25 | 2 | 6 | 6 | 6 | 48 | 7 | PbO | 11 | 1,300 |
| 13-47h* | 99 | 1 | 25 | 2 | 6 | 6 | 6 | 48 | 7 | $BiO_3$ | 11 | 1,300 |

TABLE 14

| No. | Electric properties | | | No. | Electric properties | | |
|---|---|---|---|---|---|---|---|
| | Dielectric constant ($\epsilon$) | Dielectric loss tan$\delta$ (%) | Temp. property | | Dielectric constant ($\epsilon$) | Dielectric loss tan$\delta$ (%) | Temp. property |
| 14-1* | 12,400 | 0.8 | F | 14-9 | 1,500 | 0.9 | C |
| 14-2* | 12,400 | 0.7 | F | 14-10 | 700 | 1.2 | B |
| 14-3 | 12,400 | 0.8 | F | 14-11 | 500 | 1.0 | B |
| 14-4 | 11,500 | 0.7 | F | 14-12* | compact deformed | | |
| 14-5 | 10,800 | 0.7 | F | 14-13 | 12,300 | 0.7 | F |
| 14-6 | 7,900 | 0.9 | E | 14-14 | 12,000 | 0.7 | F |
| 14-7 | 4,400 | 0.5 | E | 14-15* | 12,100 | 1.0 | F |
| 14-8 | 2,800 | 0.8 | D | 14-16 | 11,000 | 0.8 | F |

TABLE 14-continued

| No. | Dielectric constant (ε) | Dielectric loss tanδ (%) | Temp. property |
|---|---|---|---|
| 14-17 | 10,800 | 0.9 | F |
| 14-18 | 12,400 | 0.7 | F |
| 14-19 | 12,300 | 0.8 | F |
| 14-20* | 12,100 | 0.8 | F |
| 14-21* | 11,800 | 0.7 | F |
| 14-22* | 11,700 | 0.9 | F |
| 14-23* | 12,300 | 0.6 | F |
| 14-24* | 12,200 | 0.9 | F |
| 14-25 | 11,500 | 0.8 | F |
| 14-26* | 11,400 | 0.7 | F |
| 14-27* | 12,900 | 0.9 | F |
| 14-28 | 12,300 | 0.8 | F |
| 14-29* | 12,100 | 0.8 | F |
| 14-30* | 12,800 | 0.7 | F |
| 14-31 | 12,100 | 0.6 | F |
| 14-32* | 12,200 | 0.9 | F |
| 14-33* | 12,000 | 0.8 | F |
| 14-34 | 11,800 | 0.7 | F |
| 14-35* | 11,000 | 0.8 | F |
| 14-36 | 11,000 | 0.8 | F |
| 14-37* | 10,800 | 0.8 | F |
| 14-38 | 11,200 | 0.9 | F |
| 14-39* | 12,000 | 1.0 | F |
| 14-40 | 11,800 | 0.8 | F |
| 14-41* | 10,700 | 1.1 | F |
| 14-42 | 12,100 | 1.0 | F |
| 14-43* | 12,200 | 1.0 | F |
| 14-44 | 12,100 | 1.0 | F |
| 14-45* | 11,800 | 1.1 | F |
| 14-46 | 11,700 | 1.0 | F |
| 14-47* | 11,000 | 1.1 | F |

TABLE 15

| No. | Dielectric powder (wt %) | Sintering auxiliary (wt %) | Composition of sintering auxiliary | | | | | | | Additive (part by weight) | | Sintering Temp. (°C.) |
|---|---|---|---|---|---|---|---|---|---|---|---|---|
| | | | ZnO | MgO | CaO | SrO | BaO | SiO$_2$ | TiO$_2$ | | | |
| 15-1* | 100 | 0 | — | — | — | — | — | — | — | — | — | 1,210 |
| 15-2 | 99.95 | 0.05 | 30 | 1 | 6 | 6 | 7 | 47 | 3 | — | — | 1,200 |
| 15-3 | 98 | 2 | 30 | 1 | 6 | 6 | 7 | 47 | 3 | Al$_2$O$_3$ | 3 | 1,100 |
| 15-4 | 96 | 4 | 30 | 1 | 6 | 6 | 7 | 47 | 3 | — | — | 1,060 |
| 15-5 | 90 | 10 | 30 | 1 | 6 | 6 | 7 | 47 | 3 | — | — | 1,010 |

TABLE 16

| No. | Dielectric constant (ε) | Dielectric loss tanδ (%) | Temp. property |
|---|---|---|---|
| 16-1* | 1,500 | 0.4 | C |
| 16-2 | 1,500 | 0.4 | C |
| 16-3 | 1,200 | 0.6 | B |
| 16-4 | 900 | 0.8 | B |
| 16-5 | 700 | 0.8 | B |

TABLE 18

| No. | Dielectric constant (ε) | Dielectric loss tanδ (%) | Temp. property |
|---|---|---|---|
| 18-1* | 12,200 | 0.5 | F |
| 18-2 | 12,200 | 0.5 | F |
| 18-3 | 9,100 | 0.6 | E |
| 18-4 | 2,300 | 0.5 | D |
| 18-5* | compact deformed | | |

TABLE 17

| No. | Dielectric powder (wt %) | Sintering auxiliary (wt %) | Composition of sintering auxiliary | | | | | | | Additive (part by weight) | | Sintering Temp. (°C.) |
|---|---|---|---|---|---|---|---|---|---|---|---|---|
| | | | ZnO | MgO | CaO | SrO | BaO | SiO$_2$ | TiO$_2$ | | | |
| 17-1* | 100 | 0 | — | — | — | — | — | — | — | — | — | 1,290 |
| 17-2 | 99.9 | 0.1 | 25 | 2 | 5 | 10 | 5 | 43 | 10 | — | — | 1,285 |
| 17-3 | 98 | 2 | 25 | 2 | 5 | 10 | 5 | 43 | 10 | CuO | 1 | 1,220 |
| 17-4 | 90 | 10 | 25 | 2 | 5 | 10 | 5 | 43 | 10 | — | — | 1,100 |
| 17-5* | 74 | 26 | 25 | 2 | 5 | 10 | 5 | 43 | 10 | — | — | — |

In Tables 7 to 18, specimens with an asterisk (*) are those having a composition beyond the scope of the present invention, while other specimens are those included in the scope of the present invention.

From the results shown in Tables 8 and 14, it will be seen that the sintering temperature of the dielectric ceramic composition can be reduced by incorporation of the auxiliary agent of the present invention. By increasing the added amount of the auxiliary agent, the dielectric constant at room temperature is decreased, while the temperature property is improved from the F rating to the E rating, D rating, C rating and then B rating. However, the auxiliary agent has no effect on the dielectric constant if the added amount is less the 0.05 wt %. The added amount of the auxiliary agent scarcely has an effect on the dielectric loss of the dielectric ceramic composition.

As will be understood from the results shown in Tables 10 and 16, the sintering temperature of the dielectric ceramic composition can be lowered by incorporation of the auxiliary agent of the present invention. By increasing the added amount of the auxiliary agent, the dielectric constant is decreased, while the temperature property is improved from the C rating to B rating. Further, the added amount of the auxiliary agent scarcely has an effect on the dielectric loss of the dielectric ceramic composition.

As will be understood from the results shown in Tables 12 and 18, the sintering temperature of the dielectric ceramic composition can be lowered by incorporation of the auxiliary agent of the present invention. By increasing the added amount of the auxiliary agent, the dielectric constant at room temperature is decreased, while the temperature property is improved from the F rating to the E rating and then D rating. In addition, the incorporation of the auxiliary agent less than 0.1 wt % lowers the sintering temperature of the dielectric ceramic composition but has no effect on the dielectric constant. The added amount of the auxiliary agent scarcely has an effect on the dielectric loss of the dielectric ceramic composition.

What is claimed is:

1. A ceramic sintering aid, comprising a basic composition which comprises:
   (a) 5 to 40 mol % of at least two oxides selected from the group consisting of ZnO, SnO and MnO, the sum of the contents of ZnO and MnO being not less than 5 mol %,
   (b) 5 to 40 mol % of at least one metal oxide expressed by the general formula: RO where R is at least one element selected from the group consisting of Ba, Sr, Ca and Mg, and
   (c) 30 to 70 mol % of (Ti, Si)$O_2$, the content of $SiO_2$ in the (Ti, Si)$O_2$ being not less than 15 mol %.

2. A ceramic sintering aid according to claim 1 further containing at least one additive selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$, the content of the additive being not more than 20 parts by weight of the basic composition, and the content of the following oxides: $Y_2O_3$, $ZrO_2$, $WO_3$, $MoO_2$, $Fe_2O_3$, CoO, NiO, PbO and $Bi_2O_3$, being limited to not more than 10 parts by weight of the basic composition.

3. A ceramic sintering aid according to claim 1 further containing 2 to 45 mol % of $Li_2O$ as a component of the basic composition.

4. A ceramic sintering aid for sintering dielectric ceramics, consisting essentially of a basic composition and an additive incorporated therein, said basic composition consisting essentially of
   (a) 5 to 40 mol % of ZnO,
   (b) 5 to 40 mol % of at least one metal oxide selected from the group consisting of oxides of Ba, Sr, Ca and Mg, and
   (c) 30 to 70 mol % of (Ti, Si)$O_2$, the content of $SiO_2$ in the (Ti, Si)$O_2$ being not less than 15 mol %,
   said additive being at least one metal oxide selected from the group consisting of $Al_2O_3$, $B_2O_3$, CuO, $Nb_2O_5$, $Ta_2O_5$, $Ga_2O_3$, $GeO_2$, $Y_2O_3$, $ZrO_2$, $WO_3$, $MoO_2$, $Fe_2O_3$, CoO, NiO, PbO and $Bi_2O_3$, the content of the additive being not more than 20 parts by weight of the basic composition, and the content of the following oxides: $Y_2O_3$, $ZrO_2$, $WO_3$, $MoO_2$, $Fe_2O_3$, CoO, NiO, PbO and $Bi_2O_3$ being limited to not more than 10 parts by weight of the basic composition.

5. A ceramic sintering aid according to claim 2 further containing 2 to 45 mol % of $Li_2O$ as a component of the basic composition.

* * * * *